United States Patent [19]

von Bogdandy et al.

[11] 4,159,918
[45] Jul. 3, 1979

[54] METHOD OF MANUFACTURING A COMPOUND STEEL MATERIAL OF A HIGH CORROSION RESISTANCE

[75] Inventors: Ludwig von Bogdandy, Oberhausen-Sterkrade; Hans Kosmider, Bremen, both of Fed. Rep. of Germany

[73] Assignee: Klöckner-Werke AG, Duisburg, Fed. Rep. of Germany

[21] Appl. No.: 926,142

[22] Filed: Jul. 19, 1978

[30] Foreign Application Priority Data

Jul. 20, 1977 [DE] Fed. Rep. of Germany ....... 2732778

[51] Int. Cl.² ............................................. C21D 1/74
[52] U.S. Cl. ................................ 148/12.1; 148/12 R; 148/16; 148/127
[58] Field of Search ...................... 148/12 R, 12.1, 16, 148/127

[56] References Cited

U.S. PATENT DOCUMENTS

| | | | |
|---|---|---|---|
| 2,653,117 | 9/1953 | Keene | 148/12 R |
| 3,489,618 | 1/1970 | Holtzman | 148/12 R |
| 3,795,971 | 3/1974 | Chivinsky | 148/12 R |
| 3,891,820 | 6/1975 | Debray | 148/16 |

*Primary Examiner*—W. Stallard
*Attorney, Agent, or Firm*—Michael J. Striker

[57] ABSTRACT

A compound steel material of high corrosion resistance is manufactured by alloying a carbon steel carrier material having a carbon content of at most 0.20C and of at least 0.04C with a carbide and nitride forming substance, compounding the alloyed carrier material with a ferritic chromium steel material of normal carbon content, followed by hot-rolling the compound steel material to a hot rolled strip or sheet which is then annealed at a temperature and for a time period sufficient for the carbon content of the ferritic chromium steel coating layer to be reduced to between 0.001 and 0.003% so as to increase the corrosion resistance of the chromium steel material to that of a superferritic material. After annealing, the sheet may be etched and surface-finished or cold-rolled, recrystallization annealed and thereafter surface-finished, such as temper-rolled. The ferritic chromium steel material has at most 0.1% of carbon prior to annealing. The carbide and nitride forming substance may be titanium whose content in the alloyed carrier material is preferably between 0.50% and 2.00%. The thickness of the ferritic chromium steel coating layer is between 50 and 500 μm, the annealing temperature between 650° and 900° C., and the annealing time period between 8 and 72 hours.

11 Claims, No Drawings

METHOD OF MANUFACTURING A COMPOUND STEEL MATERIAL OF A HIGH CORROSION RESISTANCE

BACKGROUND OF THE INVENTION

The present invention relates to a method of manufacturing a compound material, and more particularly to a method of manufacturing such a material which has a high corrosion resistance.

The corrosion resistance of ferritic chromium steel materials is, in addition to the chromium content and the addition of, for instance, molybdenum, determined by the carbon and nitrogen content in the steel material. While the conventionally manufactured ferritic chromium steel AISI 430 corresponding to SAE 51430 has a lower resistance to oxidizing and reducing acids, bases, and sulfur dioxide and chlorine containing atmosphere than an austenitic chromium-nickel steel AISI 304 corresponding to SAE 30304, its corrosion resistance at the same chromium content improves with the reduction of the carbon and nitrogen content. When the carbon content is between 0.001 and 0.003% and the nitrogen content is not exceeding 0.01%, this chromium steel (superferrite) has corrosion resistance values which are higher than those of the austenitic chromium-nickel steel. In particular, the resistance of this superferritic steel to stress corrosion cracking, intergranular, pitting and crevice corrosion is better than the resistance of the austenitic alloyed steel. Also, the corrosion-resistance in oxidizing and reducing acids, as well as in the atmosphere, is higher than that of the austenitic chromium-nickel steel.

Ferritic chromium steel materials with reduced carbon contents of 0.001 to 0.003% could, according to the recent state of the melting and refining techniques, be manufactured only in electron beam vacuum ovens. The other improved manufacturing methods, such as the vacuum oxygen blow-refining method, the vacuum inductive melting method (VIM) and the argon-oxygen decarburization method (AOD) produce steel materials of carbon contents of between 0.01 and 0.02%. In order to give the "extra low carbon" steel materials having 0.01 to 0.02% of carbon content, a corrosion resistance which equals or exceeds the corrosion resistance of the austenitic steel materials, the carbon and nitrogen contents of the steel material must be chemically reacted, that is, stabilized. In most instances, titanium is used for the stabilization, but other alloying elements, such as niobium and tantalum can also be used for the same purpose.

Experience and tests with ferritic chromium steel materials which are stabilized with titanium have shown that such materials have a substantially higher corrosion resistance than non-stabilized chromium steel materials having a normal carbon and nitrogen content (such as SAE 51430 steel). The titanium content must be at least six times higher than the sum of the carbon and nitrogen contents. The ferritic chromium steel materials which are stabilized with titanium, however, are disadvantageous in comparison with the non-stabilized materials in that they have a lower purity and have a surface of worse quality. The surface cannot be ground to give it a mirror-like appearance.

It has also been recently proposed, in German Pat. No. 26 21 329, to compound a carrier steel material of deep-drawing grade, which is alloyed with a carbide and nitride forming substance, with a ferritic chromium steel material of normal carbon content, to roll the compound steel material to a strip of sheet, and then to anneal the compound steel material of the fine sheet at a temperature and for a time period sufficient for the carbon content of the ferritic chromium steel coating layer to be reduced to between 0.001 and 0.003%; thereby increasing the corrosion resistance of the ferritic chromium sheet material to that of a superferritic material. However, experience has shown that, under many circumstances, it is difficult to perform the annealing operation.

SUMMARY OF THE INVENTION

Accordingly, it is a general object of the present invention to avoid the disadvantages of the prior art.

More particularly, it is an object of the present invention to devise a method of producing a compound material which is provided with a chromium steel coating layer at one or more of its surfaces, wherein the corrosion resistance of the chromium steel layer corresponds to that of a superferritic material.

A further object of the present invention is to present a method of manufacturing a corrosion-resistant compound material without resorting to the use of non-stabilized superferritic materials.

In pursuance of these objects and others which will become apparent hereafter, one feature of the present invention resides, briefly stated, in a method of manufacturing a compound steel material having at least one chromium steel coating layer, which comprises the steps of alloying a carbon steel carrier material with a carbide and nitride forming substance; compounding the alloyed carrier material with a chromium steel material of normal carbon content; hot-rolling the compound steel material to a sheet or strip material; and increasing the corrosion resistance of the chromium steel material to that of a superferritic material, including annealing the compound steel material at a temperature and for a time period sufficient for the carbon content of the ferritic chromium steel coating layer to be reduced to between 0.001 and 0.003%.

DETAILED DISCUSSION OF THE PREFERRED EMBODIMENT

As mentioned above, it is an object of the present invention to obtain a material which has the same or a higher corrosion resistance than an austenitic chromium-nickel steel SAE 30 304, which has the following composition:

| C max % | Si max % | Mn max % | P max % | S max % | Cr | Ni |
|---|---|---|---|---|---|---|
| 0.07 | 1.00 | 2.00 | 0.045 | 0.030 | 17–20 | 8.50–10 |

To achieve this objective, the present invention starts with a ferritic chromium steel according to a SAE 51 430, which has the following composition:

| C max % | Si max % | Mn max % | P max % | S max 90 | Cr | Ni |
|---|---|---|---|---|---|---|
| 0.010 | 1.00 | 1.00 | 0.045 | 0.030 | 15.50–17.50 | |

This ferritic chromium steel material is compounded with a carrier material which is alloyed with carbide and nitride forming elements, in particular titanium, whereupon the compound material is hot-rolled into sheets and subsequently annealed until the carbon content in the ferritic chromium steel coating layer is reduced to between 0.001 and 0.003%.

When the method is performed in this manner in accordance with the invention, there is obtained a facilatation of the annealing operation, inasmuch as there is no need to worry about oxygen influences on and thus about scaling of the surface region.

The thickness of the hot-rolled sheet or strip material may correspond to that of course, intermediate or fine sheet material, the latter being preferred.

The carrier material which is used to form the compound material is a carbon steel having a carbon content of at most 0.20% and of at least 0.040% C. Preferably the carrier material used is a plain carbon steel or a low-alloyed carbon steel.

On the other hand, the carbon content of the ferritic chromium steel material which is to be decarburized should not be above 0.1%, and is preferably between 0.05 to 0.07%.

The titanium content in the alloyed carrier material is preferably in the range between 0.50% and 2.00%. Preferably, the thickness of the chromium steel coating layer to be decarburized is between 50 and 500 $\mu$m.

The applicable annealing temperature are preferably in the region between 650° and 900° C., while the annealing time periods can be between 8 and 72 hours depending on the titanium content of the carrier material, the thickness of the coating layer, and the selected temperature. Under certain circumstances, even substantially shorter annealing time periods are necessary.

The decarburization of the ferritic chromium steel coating layer takes place on the basis of diffusion. The advantage of this decarburizing procedure resides in the fact that only a very thin layer of the coating material is to be treated and that the treatment is accomplished after the termination of a strip or sheet manufacturing process. After the annealing, the fine sheet or strip material is dressed and adjusted as usual in the customary alloyed steel manufacturing process. According to this method, there can be obtained carbon contents in the plating layer of 0.001 to 0.003%, which gives the ferritic chromium steel a corrosion resistance which is higher than that of the austenitic chromium-nickel steel. The obtained decarburized, non-stabilized chromium steel layer is devoid of carbide inclusions and impurities and thus the exposed surface thereof can be polished to high luster (highly lustrous polished surfaces possess an even better corrosion resistance). The decarburization of thin alloyed steel layers in accordance with the diffusion process is also possible in connection with sheets of intermediate and large thickness. The decarburization is independent of the chromium content of the plating layer. The corrosion resistance of the plating layer is improved with an increasing chromium content and by addition of molybdenum.

After the decarburizing annealing operation, the hot-rolled sheet or strip material can be used for some applications after being merely etched and surface-finished, for instance, temper-rolled. However, under usual circumstances, the hot-rolled sheet is cold-rolled, afterwards recrystallization annealed, and surface-finished, such as temper-rolled, so as to obtain good mechanical properties.

Preferably, a material is used as the starting compound material in which the carrier material alloyed with titanium, in its molten state, is poured on a ferritic chromium steel sheet in a compounding process, the chromium sheet having been introduced into an ingot mold prior to the pouring or molding of the carrier material.

It will be understood that each of the elements described above, or two or more together, may also find a useful application in other types of processes differing from the types described above.

While the invention has been illustrated and described as embodied in a method of manufacturing a compound steel material of high corrosion resistance, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The compound steel material can be formed either by a compound casting process by a cladding process for example a preliminary hot rolling of the two steel partners of the compound or by explosion-cladding. It goes without saying that the round material can be manufactured in any other suitable way, for example welding.

What is claimed as new and desired to be protected by Letters Patent is set forth in the appended claims:

1. A method of manufacturing a compound steel material having at least one chromium steel coating layer, comprising the steps of alloying a carbon steel carrier material with a carbide and nitride forming substance; compounding the alloyed carrier material with a chromium steel material of normal carbon content; hot-rolling the compound steel material to a sheet; and increasing the corrosion resistance of the chromium steel material of the sheet to that of a superferritic material, including annealing the compound steel material at a temperature and for a time period sufficient for the carbon content of the ferritic chromium steel coating layer to be reduced to between 0.001 and 0.003%.

2. A method as defined in claim 1, wherein the carbon content of the ferritic chromium steel material prior to said increasing step is at most 0.1%.

3. A method as defined in claim 2, wherein the carbon content of the ferritic chromium steel material prior to said increasing step is between 0.05 and 0.07%.

4. A method as defined in claim 4, wherein the titanium content in the alloyed carrier material is between 0.50% and 2.00%.

5. A method as defined in claim 1, wherein the thickness of the ferritic chromium steel coating layer is between 50 and 500 $\mu$m.

6. A method as defined in claim 1, wherein the annealing temperature is between 650° and 900° C., depending on the thickness of the coating layer.

7. A method as defined in claim 1, wherein the annealing time period is between 8 and 72 hours, depending on the carbide and nitride forming substance content in the carrier material, on the thickness of the coating layer, and on the annealing temperature.

8. A method as defined in claim 1; and further comprising the steps of etching and surface-finishing following said annealing step.

9. A method as defined in claim 1; and further comprising the steps of cold-rolling, recrystallization annealing and subsequently surface-finishing, following said annealing step.

10. A method as defined in claim 1 wherein the carbon content of the carrier material is at most 0.20%.

11. A method according to claim 1 wherein the carbon content of the carrier material is at least 0.04%.

* * * * *